United States Patent Office 3,847,845
Patented Nov. 12, 1974

3,847,845
SEPARATION AND PURIFICATION OF THE SAPONIFIED ETHYLENE-VINYL ACETATE INTERPOLYMERS
Rentaro Tada, Kenji Sato, and Kinichi Nishioka, Kurashiki, Japan, assignors to Kuraray Co., Ltd., Kurashiki, Japan
No Drawing. Continuation-in-part of abandoned application Ser. No. 55,618, July 16, 1970. This application June 5, 1973, Ser. No. 367,288
Int. Cl. C08f 47/08
U.S. Cl. 260—2.5 M         7 Claims

ABSTRACT OF THE DISCLOSURE

A method of recovering saponified ethylene-vinyl acetate interpolymers from an anhydrous methanol solution of said interpolymers produced by saponification of an ethylene-vinyl acetate interpolymer with an alkaline catalyst, the method comprising the combination of steps of:

(i) admixing water with said solution in an amount of from 5 weight percent of the interpolymer up to the gel forming point at a temperature between about 35° C. and the boiling temperature of the aqueous methanol composition after the addition of water.

(ii) extruding the resultant aqueous solution from a slit or nozzle, the thickness or the diameter of which is between about 1 and 10 mm., into a coagulating bath solution consisting of a dilute methanol solution or water to form a microporous sheet or strand, (iii) washing said microporous sheet or strand with water to substantially remove salts of acetic acid formed by saponification and excess alkaline catalyst; and (iv) drying said microporous sheet or strand.

These sheets and strands are useful for the production of pellets or chips for the molding or melt spinning of said interpolymer.

---

This application is a continuation-in-part of application Ser. No. 55,618, filed July 16, 1970, now abandoned.

This invention relates to a method of separating and purifying saponified ethylene-vinyl acetate interpolymers, and more particularly, to an improved method of recovering saponified ethylene-vinyl acetate interpolymers from a methanol solution of the interpolymers obtained by the saponification of ethylene-vinyl acetate interpolymers in the presence of methanol with alkaline catalyst, such as caustic soda or potassium hydroxide.

An object of this invention is to provide purified saponified ethylene-vinyl acetate interpolymers having good film or fiber-forming properties. A further object is to provide pellets or chips of saponified ethylene-vinyl acetate interpolymers having a relatively high apparent specific gravity of about 0.7 to 1.2 and a microporous structure useful for the production of films, sheets or filaments, by various processes, especially molding or melt spinning processes.

It is well known that saponified ethylene-vinyl acetate interpolymer is produced by saponification of ethylene-vinyl acetate interpolymers with an alkaline catalyst such as cautic soda or potassium hydroxide, in the presence of lower aliphatic alcohols such as methanol or ethanol. After saponification has been carried out to the desired degree, the resultant saponified ethylene-vinyl acetate interpolymer is isolated, e.g. by steam distillation to remove lower aliphatic alcohols, washing the residual polymer, and drying.

It is also well known that films, sheets or filaments can be made from the resultant saponified interpolymers by molding processes, or melt, wet or dry spinning processes.

These methods are described in, for example, U.S. Pats. Nos. 2,386,347; 2,399,653 and 2,403,464 and British Pat. No. 1,120,189.

In said saponification reaction, caustic soda is generally used as an alkaline catalyst, but most of caustic soda used in the saponification reaction is converted into sodium acetate during the reaction. The thus produced sodium acetate and the residual unused caustic soda remain admixed in a concentration of a few percent in the saponified interpolymers even after the interpolymers are isolated from solution. The alkali metal acetate and the caustic soda content of the interpolymer affect the quality of the interpolymer by causing it to discolor and degrade and by changing the solubility of said polymer in the solvent. Discoloration of said interpolymers frequently results when said polymers are melt spun, molded and heat treated.

In order to avoid this discoloration, it is most desirable to wash the separated interpolymer with water immediately after separation.

The separation or isolation of the saponified ethylene-vinyl acetate interpolymers from the saponification solution is generally carried out by conventional methods, for example, by adding a precipitating agent, such as water, to the solution; by steam distillation processes which are described in U.S. Pat. Nos. 2,386,347; 2,399,653 and 2,403,464; or by cooling the solution.

In the method of separating the interpolymer by cooling the solution containing the saponified product, the loss of the interpolymer in the separation process amounts to as high as 5 weight percent or more, and the isolated interpolymer is in the form of extremely fine particles which are subject to considerable loss in the isolation, washing and drying steps.

On the other hand, in the method of adding the precipitating agent to the solution of the saponified product, although the loss of the interpolymer in the separation process is slight, the interpolymer precipitate thus isolated is liable to readily agglomerate due to the strong cohesive force thereof, and it is therefore difficult to wash and dry effectively, unless the precipitate is first crushed or pulverized. The dried product thus obtained is in the form of powder having a low apparent density of about 0.2 to 0.4. When it is desired to mold or melt spin said powder, it is often required to deaerate the molten polymer by premolding prior to making films or filaments.

Thus, the object of the invention is to provide a method of preparing a saponified ethylene-vinyl acetate interpolymer which gives a molding compound that is stable to heat, mechanically tough and highly elastic, from a solution containing the saponified interpolymers, comprising separating the saponified ethylene-vinyl acetate interpolymer in a form which is easy to handle in washing and drying, in a manner which results in a minium loss of the polymer during separation.

This and other objects can be attained in accordance with this invention, by adding water to an anhydrous methanol solution of the saponified ethylene-vinyl acetate interpolymer, or if necessary, to a concentrated solution obtained by vaporizing the methanol from said solution, and contacting the aqueous methanol solution, thus obtained, in the form of a sheet or strand maintained at a thickness or diameter of between 1 and 10 mm., with a coagulating bath.

The dissolved saponified ethylene-vinyl acetate interpolymer used in the present invention is obtained by saponification of an ethylene-vinyl acetate interpolymer having the general formula (I):

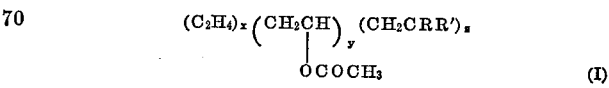

wherein R is hydrogen or methyl, R' is —COOR, $C_6H_5$—, —Cl, —CN, methyl or vinyl; the ratio $(Y+Z):X$ is within the range of 1.5:1 to 3:1 and $Z:Y$ is within the range of 0:1 to 0.1:1 under substantially anhydrous conditions in the presence of methanol with an alkaline catalyst such as caustic soda or potassium hydroxide and until the degree of saponification is at least 90 mol percent. The interpolymers are formed by conventional vinyl polymerization of ethylene-vinyl acetate and copolymerizable monomers in proportions consistent with the formation of an interpolymer of formula I.

The preferable concentration of the ethylene-vinyl acetate interpolymer in the saponification reaction mixture is in the range of about 25 to 50 weight percent. The mol ratio of alkaline catalyst used to effect saponification of the interpolymer is in the range of about 0.005 to 0.5 based on the mol content of acetic acid radical in the interpolymer.

The amount of the water admixed with the methanol solution of said saponified ethylene-vinyl acetate must be less than the amount which causes gelation of the saponified interpolymer at a temperature between 35° C. and the boiling temperature of the aqueous composition after the addition of water. Thus, after the addition of water, the saponified interpolymer must remain dissolved in the aqueous solution at any temperature to which it will be subjected during the process. Thus, if the solution is formed at higher temperatures and then cooled, the amount of water should be such that the interpolymer will remain dissolved at the lower temperature. The amount of water necessary to dissolve the saponified product principally depends on the ethylene content and the degree of saponification of the interpolymer, polymer concentration of saponified interpolymer and the temperature of the solution, and is generally at least 5 weight percent of the interpolymer in solution.

Said saponified interpolymer, when put in contact with the coagulating bath, coagulates in a few minutes with minimum loss of the polymer and gives a microporous sheet or strand, depending on whether a slit or nozzle is used for extrusion, which can be easily handled.

The preferred mode of operating in accordance with the process of this invention is to saponify ethylene-vinyl acetate interpolymer by adding an alkaline catalyst to a 25–50 weight percent methanol solution of ethylene-vinyl acetate interpolymer in a mol ratio of 0.005–0.5 of the alkaline catalyst base upon the mol content of acetic acid radical in said interpolymer, if required, after concentration, adding water to the saponified interpolymer in an amount which at the temperature of said solution, does not cause said saponified product to separate, to obtain an aqueous methanol solution containing at least 5 weight percent water based on the weight of the interpolymer, and 15–45 weight percent, preferably 20–40 weight percent, of the saponified interpolymer, shaping and coagulating the saponified product by: (a) extruding the solution into a coagulating bath through a slit having an opening suitable for obtaining a sheet of desired thickness; (b) forming a film of the solution of the saponified product of a thickness of 1–10 mm. on a flat plate, and then contacting the film with a coagulating solution, or (c) extruding a solution of the saponified product through a nozzle having a hole diameter suitable for obtaining strands of the desired diameter, e.g. 1–10 mm., into a coagulating bath. When the concentration of the interpolymer in an aqueous methanol solution is too low, it is impossible to coagulate the product in the form of the sheet or strand, and when the concentration is too high, the product will lack porosity. Accordingly, a range of 15–45 weight percent concentration of said saponified interpolymer in an aqueous methanol solution is desirable.

As the coagulating bath to be used in the invention, water alone or a mixture of water with methanol is desirable; and particularly a mixture of methanol and water containing 10–50 weight percent methanol is most suitable. The methanol concentration in the coagulating bath solution should be equal to or lower than in the extruded aqueous solution. Higher methanol concentrations are undesirable since the saponified interpolymer is more soluble therein and there is a resultant loss of saponified polymer in the coagulating bath solution. The temperature at which the solution of the saponified interpolymer is contacted with the coagulating bath solution should be less than the temperature at which the interpolymer is insoluble in the coagulating bath solution, and a lower temperature is desirable to minimize loss of the interpolymer in the separation process, 10–30° C. being generally preferable. Sheets and strands obtained as above are microporous, easy to wash, and the loss in the separation process is 0.8 weight percent at the most, or less than ⅛ the loss occurring in conventional methods of merely cooling the solution. Coagulating baths should be maintained at a temperature which is not more than 50° C. since at higher temperature, the efficiencies of the method of this inventon are not realized.

The product of this invention in the form of sheets obtained as above can be washed and dried in the original form or after being cut into the rods or pelletized, and the product in the form of strands can be washed and dried as is, or after being pelletized.

This invention will be illustrated in detail in the following examples which are presented in illustration, but not limitation thereof.

Example 1

40 parts of ethylene-vinyl acetate interpolymer containing 32.5 mol percent of ethylene, 70 parts of methanol and 4 parts of caustic soda, were mixed to make a solution, and heated at 60° C. for 3 hours to saponify said interpolymer by a conventional saponification technique. During the reaction, the mixture consisting of 12 parts of methyl acetate and 5 parts of methanol was distilled out from the reaction system. The degree of saponification of the saponified ethylene-vinyl acetate interpolymer in the resultant methanol solution reached 98.5 mol percent.

The solution thus obtained was then concentrated by heating until the content of said interpolymer in solution reached 40 weight percent.

26 parts of water was added to 100 parts of said concentrated solution at 60° C. The saponified ethylene-vinyl acetate interpolymer in the resultant solution did not separate under the described conditions of interpolymer concentration, degree of saponification and temperature.

100 g. of the resultant solution was extruded from a slit of 3 mm. thickness and 30 cm. width into 1 kg. of a coagulating bath solution consisting of 30 weight percent of methanol and 70 weight percent of water maintained at 15° C. The coagulation of the extruded solution was completed in 7 minutes, and a microporous sheet which measured 30 cm. x 12 cm. x 2 mm., was obtained.

As the sheet had microporous structure, the sheet was easy to wash and dry.

After washing with water to eliminate sodium acetate and drying, the resultant sheet had a tensile strength of 23 kg./cm.$^2$, an elongation of 310% and an apparent specific gravity of about 1.0.

The sheet is converted to pellets useful for the production of films or filaments by cutting said sheet with a pelletizer.

The loss of the interpolymer in the separation process in this case amounted to only 0.2 weight percent.

Example 2

100 g. of an aqueous methanol solution of saponified ethylene-vinyl acetate interpolymer which was obtained by the same method described in Example 1 was extruded through a nozzle having an aperture of 5 mm. diameter into 1 kg. of the coagulating bath solution as given in Example 1, and said interpolymer was separated and coagulated in the form of strand, taking 4 minutes for coagulation. The resultant product in the form of strands was microporous and easy to wash, and could be cut into pellets for molding, after drying, by the pelletizer. The apparent specific gravity of the product in pellets was 0.99. Only 0.5 weight percent of interpolymer was lost in the separation process.

Example 3

An aqueous methanol solution of the saponified ethylene-vinyl acetate interpolymer which was obtained by the method of Example 1 was poured on a 15 cm. x 15 cm. glass plate having a frame of 3 mm. height and immediately immersed in 400 g. of the coagulating bath solution at 30° C., consisting of 10 weight percent methanol and 90 weight percent water. The coagulation was completed in 15 minutes, and a sheet of 15 cm. x 15 cm. x 1.2 mm. was obtained. It was microporous and easy to wash, and had a tensile strength of 15 kg./cm.$^2$, an elongation of 410% and an apparent specific gravity of 0.89. The loss of the interpolymer in the separation process was only about 0.4 weight percent.

Example 4

200 weight parts of the interpolymer of 28 mol percent ethylene, 70 mol percent vinyl acetate and 2 mol percent acrylic acid was dissolved in 400 weight parts of methanol, to which 15 weight parts of caustic soda was added, and reacted at 60° C. for two hours. The resultant saponified solution at saponification degree of 96 mol percent, containing 28 mol percent ethylene and 2 mol percent acrylic acid was concentrated to 35 weight percent concentration of said interpolymer, and to 100 weight parts of said concentrated interpolymer solution was added 25 weight parts of water to produce an aqueous methanol solution of said interpolymer at 60° C. 100 g. of the interpolymer solution was extruded through a slit 30 cm. x 4 mm. into a coagulating bath solution consisting of 20 weight percent of methanol and 80 weight percent of water and maintained at 25° C. Completion of coagulation took 13 minutes, and a sheet having 3 mm. of thickness was obtained. Said sheet has the microporous structure and is easy to wash free of sodium acetate. It is easily handled during washing and drying. The loss of the interpolymer in the separation process was only 0.3 weight percent. The sheet was cut into pellets by the pelletizer before drying and then dried. The sheet also was cut into similar pellets after drying. The apparent specific gravity of the product was 0.95.

Example 5

100 g. of an aqueous methanol solution of saponified ethylene-vinyl alcohol interpolymer obtained by treating an ethylene-vinyl acetate interpolymer containing 38 mol percent of ethylene by the method of Example 1 until the degree of saponification reached 97.2%, was extruded through a slit of 30 cm. x 3 mm. into the coagulating bath solution at 14° C., consisting 15 weight percent of methanol and 85 weight percent of water. Upon complete coagulation in 6 minutes, there was obtained a sheet which was microporous and markedly easy to wash free of sodium acetate and other similar impurities, and had a tensile strength of 25 kg./cm.$^2$ and an elongation of 290%. Only 0.3 weight percent polymer was lost in the separation process.

This invention can be used to separate and purify other saponified interpolymers than those specifically identified in the above examples, such as those prepared by the saponification of interpolymers of ethylene-vinyl acetate and one or more modifying polymerizable monomers such as acrylic acid, methyl acrylate, styrene, vinyl chloride, acrylonitrile, methacrylic acid, methacrylonitrile and the like.

What is claimed is:

1. A method of separating and purifying a saponified ethylene-vinyl acetate interpolymer from a substantially anhydrous solution containing 25 to 50 weight percent of said interpolymer which is obtained by saponification of an ethylene-vinyl acetate interpolymer having the general formula:

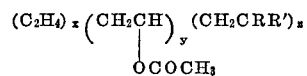

wherein R is hydrogen or methyl, R' is —COOR, —C$_6$H$_5$, —Cl, —CN, methyl or vinyl; the ratio of $(Y+Z):X$ is within the range of 1.5:1 to 3:1 and the ratio $Z:Y$ is within the range of 0:1 to 0.1:1 under substantially anhydrous conditions and in the presence of methanol with 0.005 to 0.5 mols of an alkaline catalyst, based on the mol concentration of acetic acid radical in the interpolymer, the degree of saponification being at least 90 mol percent, which comprises:

(a) admixing water with said substantially anhydrous solution in an amount of at least 5 weight percent of the interpolymer up to an amount which does not cause gelation and separation of saponified interpolymer in said solution at the temperature of said solution, to produce an aqueous methanol solution having 15 to 45 weight percent of said saponified interpolymer, (b) shaping said solution of saponified interpolymer into a sheet or strand of 1–10 mm. thickness and bringing said sheet or strand into contact with an aqueous coagulating bath to form a gelled microporous sheet or strand, (c) washing said gelled microporous sheet or strand to remove the remaining alkaline catalyst and acetic acid salt produced during saponification, and (d) drying said washed microporous sheet or strand.

2. The method of claim 1 wherein the saponified interpolymer is obtained by saponification with caustic soda in methanol.

3. The method of claim 1 wherein the concentration of saponified interpolymers in the methanol solution is in the range of 20 to 40 weight percent.

4. The method of claim 1 wherein the coagulating bath is a mixture of a methanol and water.

5. A method according to claim 4 wherein the concentration of methanol in the coagulating bath is in the range of 10 to 50 weight percent.

6. A pellet or a chip having an apparent specific gravity of about 0.7 to 1.2 and a microporous structure, useful for production of films or filaments by molding or melt spinning, which is produced by cutting the microporous sheet or strand produced by the process of claim 1.

7. A microporous sheet or strand of saponified ethylene-vinyl acetate interpolymer produced by the process of claim 1.

References Cited

UNITED STATES PATENTS 2,386,347  10/1945  Roland _____ 260—87.3
3,167,604   1/1965  Arakawa et al. ___ 260—91.3 VA MORTON FOELAK, Primary Examiner U.S. Cl. X.R.

260—2.5 R, 87.3, 91.3 VA, Dig. 22; 264—41, 184, 185